United States Patent [19]
Goddard

[11] 3,883,550
[45] May 13, 1975

[54] HERBICIDES

[75] Inventor: Steven Jerome Goddard, West Grove, Pa.

[73] Assignee: E. I. du Pont de Nemours & Company, Wilmington, Del.

[22] Filed: May 20, 1974

[21] Appl. No.: 471,808

[52] U.S. Cl. .............................. 260/310 C; 71/92
[51] Int. Cl. .................................. C07d 49/02
[58] Field of Search ........................ 260/310 C

[56] References Cited
OTHER PUBLICATIONS
Chemical Abstracts, Vol. 43: 7934a, (1949); Vol. 49; 10211f, 10212a, (1955); Vol. 56: 14127g, (1962).

Primary Examiner—Albert T. Meyers
Assistant Examiner—Donald B. Moyer

[57] ABSTRACT

Indazoles of the formula:

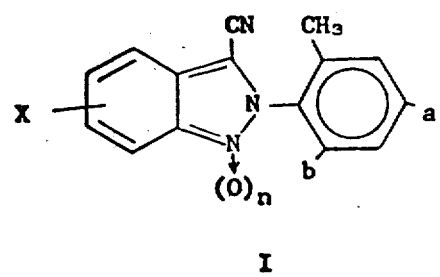

wherein
 $a$ is chlorine, bromine or methyl,
 $b$ is chlorine, bromine or methyl,
 X is hydrogen or fluorine, and
 $n$ is 0 or 1.

Such compounds are useful as herbicides and in particular they are useful as selective herbicides for control of barnyard grass in rice and for control of crabgrass in turf.

Exemplary of the compounds is 2H-indazole-3-carbonitrile-2-(2,4,6-trimethylphenyl)-1-oxide.

4 Claims, No Drawings

HERBICIDES

BACKGROUND OF THE INVENTION

A number of indazole-type compounds are known in the prior art:

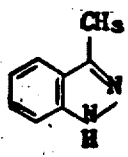

is disclosed in Chem. Abstr. 53, 7493d: A. J. Musgrave and I. Kukovic, Ann. Rept. Entomol. 87, 19(1956). 3-Methyl-indazole is disclosed as phytotoxic to bean leaves.

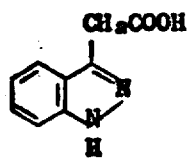

is disclosed in Chem. Abstr. 57, 5057b: K. P. Hellman, H. M. Sell and S. H. Wittmer, Phyton 17, 11 (1961). 3-Indazole acetic acid is disclosed as a growth regulant on plant parts.

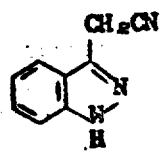 and 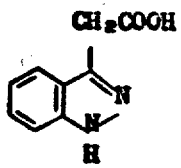

are disclosed in Derwent H-5016, Fujisawa Pharm. Co. and Nissan Chem. Ind. 3-Indazole acetonitrile and 3-indazole acetic acid (and esters) are disclosed as plant growth (root development) regulants.

Other uses for indazoles and indiazoles are photographic and pharamacologic in nature.

It has now been discovered that certain novel indazoles are useful as herbicides. In particular, these novel indazoles may be used as selective herbicides on crops such as rice and for control of crabgrass in turf. Such herbicidal activity has not been disclosed in the prior art.

SUMMARY OF THE INVENTION

This invention is a method and composition for the control of undesired vegetation comprising applying to the locus of such undesired vegetation a herbicidally effective amount of a novel compound of the formula:

wherein
$a$ is chlorine, bromine or methyl,
$b$ is chlorine, bromine or methyl,

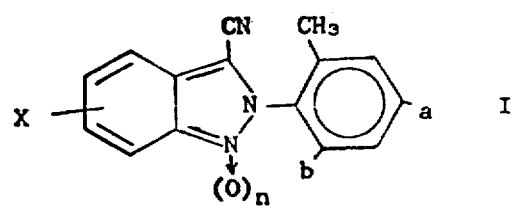

X is hydrogen or fluorine, and
$n$ is 0 or 1.

Preferred for their higher herbicidal activity and crop selectivity, are those compounds of Formula I wherein:
$a$ is methyl,
$b$ is bromine, chlorine or methyl,
X is hydrogen and
$n$ is 0 or 1.

Especially preferred for its highest herbicidal activity is 2H-indazole-3-carbonitrile-2-(2,4,6,-trimethylphenyl)-1-oxide which has a melting point from 183.5°–185.5°C.

DESCRIPTION OF THE INVENTION

Preparation of the Compounds

The preparation of the subject compounds is similar to a procedure described by A. Reissert and F. Lemmer in Chem. Ber. 59, 351 (1926) and G. Heller and G. Stielmeyer (Chem. Ber., 58, 834 (1925.) The process to be utilized in order to form the compositions of the instant invention is as follows:

Step 1

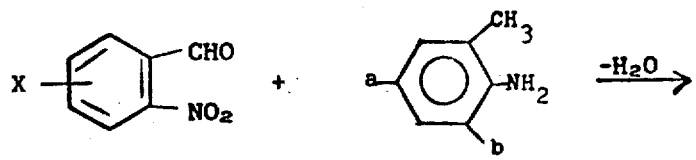

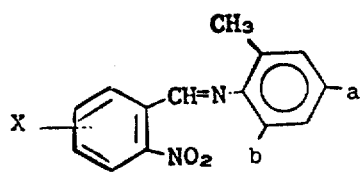

A

Step 2
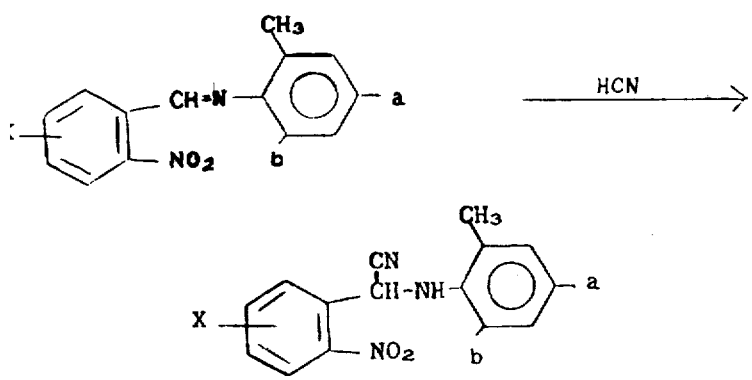
B
Step 3
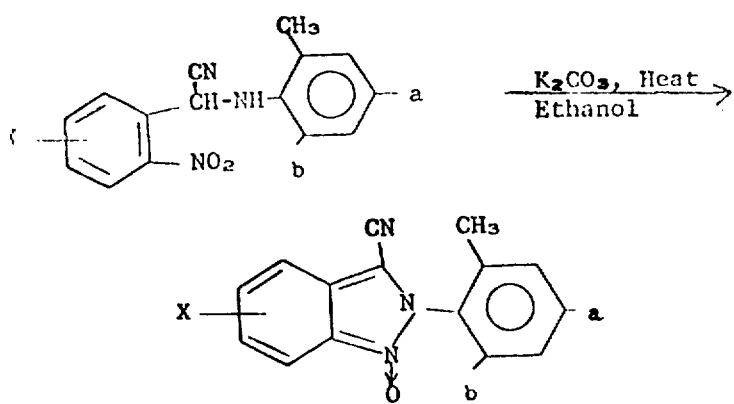
C
Step 4
(optional)
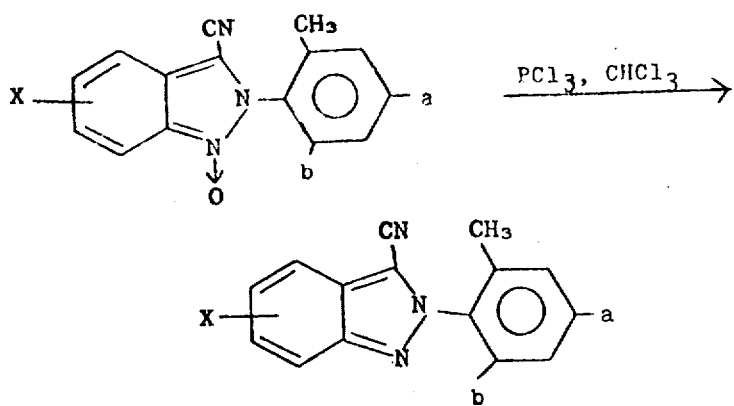
D wherein

*a* is chlorine, bromine or methyl, preferably methyl;
*b* is chlorine, bromine or methyl, preferably chlorine, bromine or methyl; and
X is hydrogen or fluorine, preferably hydrogen.

Step 1

The combination of 2-nitrobenzaldehyde and an aniline to form amine A in refluxing aromatic hydrocarbon solution, with provision to remove the water formed, is well known to those skilled in the art. A typical aromatic hydrocarbon solution which would be utilized would be benzene. The reaction takes place at a temperature of about 78°C. to 80°C. and atmospheric pressure. Typically, the water is removed as an azeotrope with the aromatic hydrocarbon.

Step 2

The addition of hydrogen cyanide to amine A is accomplished by treating A in acetic acid solution with alkali cyanide such as sodium cyanide, potassium cyanide, or lithium cyanide.

This treatment takes place at a temperature of about 25° to 40°C. and at atmospheric pressure. The reaction continues until cyanoamine B precipitates in Step 2.

Step 3

To form the indazole-1-oxide C, the cyanoamine B is treated in a refluxing suspension of a lower alcohol such as ethanol with a catalytic amount of aqueous alkali carbonate, e.g., sodium carbonate or potassium carbonate. By a catalytic amount, it is meant a solution of 0.1–1.0% of the weight of cyanoamine B of an alkali carbonate diluted tenfold with water. The refluxing takes place at a temperature of about 77° to 80°C. and at atmospheric pressure.

Step 4

Optionally, the indazole-1-oxide, C, may be reduced by any conventional means such as contact with phosphorus trichloride in refluxing chloroform at a temperature of about 60° to 62°C. and at atmospheric pressure. Reduction is necessary in those instances wherein *n* in Formula I is equal to 0.

Preferred compounds which may be prepared by the instant process are as follows:

|  | m.p. |
|---|---|
| 2H-indazole-3-carbonitrile-2-(2,4-6-trimethylphenyl)-1-oxide | 183.5–185.5°C |
| 2H-indazole-3-carbonitrile-2-(2,4-dimethyl-6-chlorophenyl)-1-oxide | 189.0–191.5°C |
| 2H-indazole-3-carbonitrile-2-(2,4,6-trimethylphenyl) | 102–103°C |
| 2-H-indazole-3-carbonitrile-6-fluoro-2-(2,4,6-trimethylphenyl)-1-oxide | 163–164°C |

The following examples are given to illustrate the above-described process. All parts are by weight unless specified otherwise.

EXAMPLE 1

Preparation of 2H-indazole-3-carbonitrile-2-(2,4,6-trimethylphenyl)-1-oxide

A solution of 100 parts 2-nitrobenzaldehyde and 89.5 parts 2,4,6-trimethylaniline in 1500 parts of benzene was refluxed for 2 hours at 80°C. with provision to continuously remove the water formed by the use of a Dean-Stark trap. One-half the benzene was distilled, and the remaining solvent was removed under reduced pressure to yield an orange oil. Crystallization from methanol at -40°C. yielded 170.2 parts N-2-nitrobenzylidene-2,4,6-trimethylaniline as orange plates melting at 76°–77°C.

A solution of 150 parts of N-2-nitrobenzylidene-2,4,6-trimethylaniline in 750 parts acetic acid was treated with stirring at 25°C. in one portion with 32.8 parts of sodium cyanide. A mild exotherm to 35°C. was followed by a precipitation of product. After stirring for 16 hours, the precipitate was filtered to give 150 parts 2-(2-nitrophenyl)-2-(2,4,6-trimethylanilino)-acetonitrile melting at 142°–144°C.

A refluxing suspension of 140 parts 2-(2-nitrophenyl)-2-(2,4,6-trimethylanilino)-acetonitrile in 1000 parts 95% ethanol was treated at once at 80°C. with 10 parts 10% aqueous potassium carbonate. A vigorous exothermic reaction resulted in a darkening solution. After refluxing for 1 hour, the solution was cooled to 0°C. and filtered to yield 118 parts 2H-indazole-3-carbonitrile-2-(2,4,6-trimethylphenyl)-1-oxide as intense yellow crystals melting at 177°–183°C.

EXAMPLE 2

2H-Indazole-3-carbonitrile-2-(2,4,6-trimethylphenyl)

A suspension of 40 parts 2H-indazole-3-carbonitrile-2-(2,4,6-trimethylphenyl)-1-oxide in 300 parts chloroform was treated dropwise over 5 minutes with 26 parts phosphorous trichloride at 25°C. The mixture was refluxed for 1 hour and poured over 500 parts ice. The organic phase was separated and washed with 100 parts water and 100 parts 10% aqueous sodium carbonate. After drying the organic phase with anhydrous sodium sulfate, it was evaporated under reduced pressure of 50 mm. to an oil. The resulting oil was crystallized from ethanol at -40°C. to yield 22 parts 2H-indazole-3-carbonitrile-2-(2,4,6-trimethylphenyl) melting at 98°–99°C.

The compounds of the following table can be made by the procedures described in Example 1.

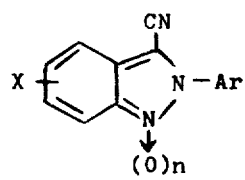

| X | n | Ar | m.p.(°C.) |
|---|---|---|---|

| | | | | |
|---|---|---|---|---|
| 6-F | 1 | 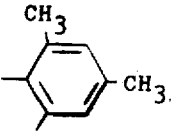 | | 163–164 |
| H | 1 | 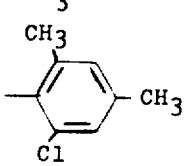 | | 189.0–190.5 |
| 5 | H | 1 | 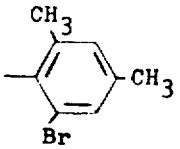 | 209–210 |
| H | 0 | 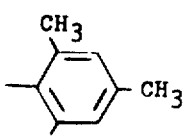 | | 133–134 |
| 5-F | 0 | 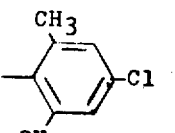 | | |
| 4-F | 1 | 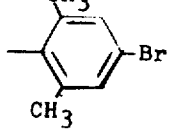 | | |
| 7-F | 1 | 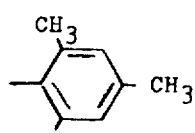 | | |

Formulation and Use of the Compound

The compounds of Formula I are useful wherever general weed control is required, such as in industrial areas, railroad-rights-of-way and areas adjacent to croplands in agricultural areas. The indazoles of the instant invention exhibit selective herbicidal action in crops. By properly selecting an indazole, a rate and a time of application, barnyardgrass in rice may be controlled as well as crabgrass in turf.

The amount of indazole to be used in any given situation will, of course, vary according to the particular end result desired, the use involved, the plant and soil involved, the formulation used, the mode of application, prevailing weather conditions, foliage density and like factors. Since so many variables play a role, it is not possible to indicate a rate of application suitable for all situations. Broadly speaking however, the indazoles are used at levels of about 0.5 kg./ha. to about 4 kg/ha. For selective control of barnyard grass in rice fields, rates of about 1/4 to 10 kg./ha. will generally be used, preferably about 1 to 4 kg.

The compounds of this invention may be combined with all other herbicides and are particularly useful in combination with bromacil (3-sec-butyl-5-bromo-6-methyluracil), diuron (3-/3,4-dichlorophenyl/-1,1-dimethylurea), paraquat (1,1'-dimethyl-4,4'-biphyridinium ion), 1,1-dimethyl-3,3-N-tert-butylcarbamoyloxyphenyl)urea, 4-amino-6-tert-butyl-3-methyl-thio-as-triazin-5(4H)-one, and the S-triazines such as 2-chloro-4-ethylamino-6-isopropylamino-S-triazine, for controlling a broad spectrum of weeds.

Useful formulations of the compounds of Formula I can be prepared in conventional ways. They include dusts, granules, pellets, solutions, suspensions, emulsions, wettable powders, emulsifiable concentrates and the like. Many of these may be applied directly. Sprayable formulations can be extended in suitable media and used at spray volumes of from a few pints to several hundred gallons per acre. High strength compositions are primarily used as intermediates for further formulation. The formulations, broadly, contain about 1% to 99% by weight of active ingredient(s) and at least one of a) about 0.1% to 20% surfactant(s) and b) about 5% to 99% solid or liquid diluent(s). More specifically, they will contain these ingredients in the following approximate proportions:

|  | Percent by Weight | | |
|---|---|---|---|
|  | Active Ingredient | Diluent(s) | Surfactant(s) |
| Wettable powders | 20–90 | 0–74 | 1–10 |
| Oil suspensions, emulsions, solutions (including emulsifiable concentrates) | 5–50 | 40–95 | 0–15 |
| Aqueous suspensions | 10–50 | 40–84 | 1–20 |
| Dusts | 1–25 | 70–99 | 0–5 |
| Granules and pellets | 1–95 | 5–99 | 0–15 |
| High-strength compositions | 90–99 | 0–10 | 0–2 |

Lower or higher levels of active ingredient can, of course, be present depending on the intended use and the physical properties of the compound. Higher ratios of surfactant to active ingredient are sometimes desirable and are achieved by incorporation into the formulation or by tank mixing.

Typical solid diluents are described in Watkins et al., *Handbook of Insecticide Dust Diluents and Carriers*, 2nd Ed., Dorland Books, Caldwell, NJ. The more absorptive diluents are preferred for wettable powders and the denser ones for dusts. Typical liquid diluents and solvents are described in Marsden, "Solvents Guide", 2nd Ed., Interscience, NY, 1950. Solubility under 0.1% is preferred for suspension concentrates; solution concentrates are preferably stable against phase separation at 0°C. "McCutcheon's Detergents and Emulsifiers Annual", Allured Publ. Corp., Ridgewood, N.J., as well as Sisely and Wood, "Encyclopedia of Surface Active Agents", Chemical Publ., Co., Inc., NY 1964, list surfactants and recommended uses. All formulations can contain minor amounts of additives to reduce foam, caking, corrosion, microbiological growth, etc. Preferably, ingredients should be approved by the U.S. Environmental Protection Agency for the use intended.

The methods of making such formulations are well known. Solutions are prepared by simply mixing the ingredients. Fine, solid compositions are made by blending and, usually, grinding, as in a hammer or fluid energy mill. Suspensions are prepared by wet-milling (see, for example, Littler, U.S. Pat. No. 3,060,084). Granules and pellets may be made by spraying the active material upon preformed granular carriers or by agglomeration techniques. See J. E. Browning, "Agglomeration", Chemical Engineering, Dec. 4, 1967, pp. 147 ff., and "Perry's Chemical Engineer's Handbook", 4th Ed., McGraw-Hill, NY, 1963, pp. 8–59 ff.

For further information regarding the art of formulation, see, for example:

H. M. Loux, U.S. Pat. No. 3,235,361; Feb. 15, 1966; Col. 6, Line 16 through Col. 7, Line 19 and Examples 10 through 41

R. W. Luckenbaugh, U.S. Pat. No. 3,309,192; March 14, 1967; Col. 5, Line 43 through Col. 7, Line 62 and Exs. 8, 12, 15, 39, 41, 52, 53, 58, 132, 138–140, 162–164, 166, 167, 169–182

H. Gysin and E. Knusli, U.S. Pat. No. 2,891,855; June 23, 1959; Col. 3, Line 66 through Col. 5, Line 17 and Examples 1–4

G. C. Klingman, "Weed Control as a Science", John Wiley & Sons, Inc., New York, 1961 pp. 81–96.

J. D. Fryer and S. A. Evans, "Weed Control Handbook", 5th Edn. Blackwell Scientific Publications, Oxford, 1968, pp. 101–103.

Typical formulations of the instant invention are as follows. Unless otherwise indicated all parts and percentages are by weight.

EXAMPLE 3

| Wettable Powder | % |
|---|---|
| 2H-indazole-3-carbonitrile-2-(2,4,6-trimethylphenyl)-1-oxide | 40 |
| dioctyl sodium sulfosuccinate | 1.5 |
| sodium ligninsulfonate | 3 |
| low viscosity methyl cellulose | 1.5 |
| attapulgite | 54 |

The ingredients were thoroughly blended, passed through an air mill, to produce an average particle size under 15 microns, reblended, and sifted through a U.S.S. No. 50 sieve (0.3 mm opening) before packaging.

EXAMPLE 4

| Extruded Pellet | % |
|---|---|
| 2H-indazole-3-carbonitrile-6-fluoro-2-(2,4,6-trimethylphenyl)-1-oxide | 25 |
| anhydrous sodium sulfate | 10 |
| crude calcium ligninsulfonate | 5 |
| sodium alkylnaphthalenesulfonate | 1 |
| calcium/magnesium bentonite | 59 |

The ingredients were blended, hammer milled and then moistened with about 12% water. The mixture was extruded as cylinders about 3 mm long. These may be used directly after drying, or the dried pellets may be crushed to pass a U.S.S. No. 20 sieve (0.84 mm openings). The granules held on a U.S.S. No. 40 sieve (0.42 mm openings) may be packaged for use and the fines recycled.

EXAMPLE 5

|  | % |
|---|---|
| 2H-indazole-3-carbonitrile-2-(2,4-dimethyl-6-chlorophenyl)-1-oxide | 25 |
| hydrated attapulgite | 3 |
| crude calcium ligninsulfonate | 10 |
| sodium dihydrogen phosphate | 0.5 |
| water | 61.5 |

The ingredients were ground together in a ball or roller mill until the solid particles have been reduced to diameters under 10 microns.

EXAMPLE 6

| | |
|---|---|
| 2H-indazole-3-carbonitrile-2-(2,4,6-tri- methylphenyl) | 20.0% |
| isophorone | 72.0% |
| blend of oil-soluble sulfonates with polyoxyethylene ethers | 8.0% |

The above ingredients were blended with warming until a homogeneous, emulsifiable solution results.

EXAMPLE 7

| | |
|---|---|
| 2H-indazole-3-carbonitrile-2-(2,4,6-tri- methylphenyl)-1-oxide | 95.0% |
| sodium alkylnaphthalene sulfonate | 2.0% |
| finely-divided synthetic silica | 3.0% |

The above ingredients were blended, hammer-milled through an 0.30 mm screen and reblended. The resulting high-strength composition can be used directly or is suitable for further formulation.

Utility

The compounds disclosed in this invention are useful as herbicides and particularly as preemergent herbicides to selectively control barnyard grass (*Echinochloa crusgalli*) in rice (*Oryza sativa L.*) and crabgrass (*Digitaria spp.*) in established Kentucky bluegrass (*Poa pratensis*) turf.

The compounds are generally applied preemergent to barnyard grass, rice, and crabgrass; they may be applied preemergent or postemergent to bluegrass. It is preferred that the bluegrass turf be established and at least several months old at the time of treatment. Rates ranging from 0.5 to 4 kg./ha. are effective depending on soil type and environmental conditions. Rainfall or irrigation within one week following treatment is desirable for maximum herbicidal activity.

The compounds may, on occasion, be applied postemergent to rice if, for instance, a rice culture is transplanted and preemergent control for barnyard grass is needed.

The following examples indicate the utility of the compounds of the instant invention. All parts and percentages are by weight unless otherwise indicated.

EXAMPLE 8

Test compounds were applied in an acetone-based solvent to pots containing seeds of two rice varieties and barnyard grass, all planted in soil. After being maintained in a greenhouse for three weeks, plant response ratings were taken. The ratings are presented in Table I.

TABLE 1

Compound Evaluation for Preemergence Control of Barnyardgrass in Rice

| Treatment | Plant Response" Nato Rice | CSM3 Rice | Barnyardgrass |
|---|---|---|---|
| Control (solvent) | 0 | 0 | 0 |
| (a) 2H-indazole-3-carbonitrile- 2-(2,4,6-trimethyl- phenyl)-1-oxide | | | |
| ¼ kg/ha | 0 | 0 | 5G |
| ½ kg/ha | 0 | 0 | 9C |
| (b) 2H-indazole-3-carbonitrile- 2-(2,4,6-trimethylphenyl) | | | |
| ½ kg/ha | 0 | 0 | 2G |

TABLE 1-Continued

Compound Evaluation for Preemergence Control of Barnyardgrass in Rice

| Treatment | Plant Response" Nato Rice | CSM3 Rice | Barnyardgrass |
|---|---|---|---|
| 1 kg/ha | 0 | 0 | 3G |
| 2 kg/ha | 4G | 0 | 3C,9G |

"0 = no effect, 10 = complete kill, C = chlorosis and/or necrosis, and G = growth retardation.

EXAMPLE 9

Pots of seven-month-old Kentucky bluegrass and eighteen-day-old crabgrass were treated with 2H-indazole-3-carbonitrile-2-(2,4,6-trimethylphenyl)-1-oxide. At the same time, crabgrass and bluegrass planted in pots of Fallsington sandy loam soil were treated preemergent. Treatment was applied on 60 g./A. of an acetone-based solvent. The treated plants along with appropriate controls were maintained in a greenhouse for 21 days; then plant response ratings were taken. The table below containing the results shows that this treatment may be effectively used to control crabgrass in established or newly seeded lawns.

Crabgrass Control in Turf

| | kg/ha | Postemergent* Bluegrass | Crabgrass | Preemergent* Bluegrass | Crabgrass |
|---|---|---|---|---|---|
| 2H-indazole- 3-carbon- itrile-2- (2,4,6-tri- methyl- phenyl)-1- oxide | 2 | 0 | 1G | 1C,1G | 9G |
| | ½ | 0 | 0 | 0 | 4G |

*Plant response evaluated 21 days after treatment 16 0 = no response
10 = maximum response
C = chlorosis - necrosis
G = growth retardation

What is claimed is:

1. A compound of the formula:

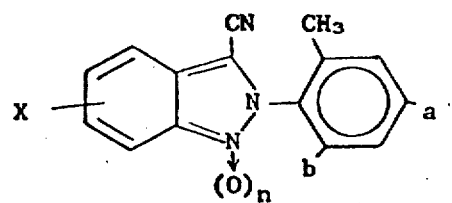

wherein
  *a* is chlorine, bromine or methyl;
  *b* is chlorine, bromine, or methyl;
  X is hydrogen or fluorine; and
  *n* is 0 or 1.

2. The compound of claim 1 wherein *a* is methyl; *b* is chlorine, bromine, or methyl; X is hydrogen; and *n* is 0 or 1.

3. The compound of claim 1 which is 2H-indazole-3-carbonitrile-2-(2,4,6-trimethylphenyl)-1-oxide.

4. The compound of claim 1 which is 2H-indazole-3-carbonitrile-2-(2,4,6-trimethylphenyl).

* * * * *